Feb. 12, 1952 F. P. WEID ET AL 2,585,416
CELERY HARVESTER
Filed May 25, 1949 5 Sheets-Sheet 1
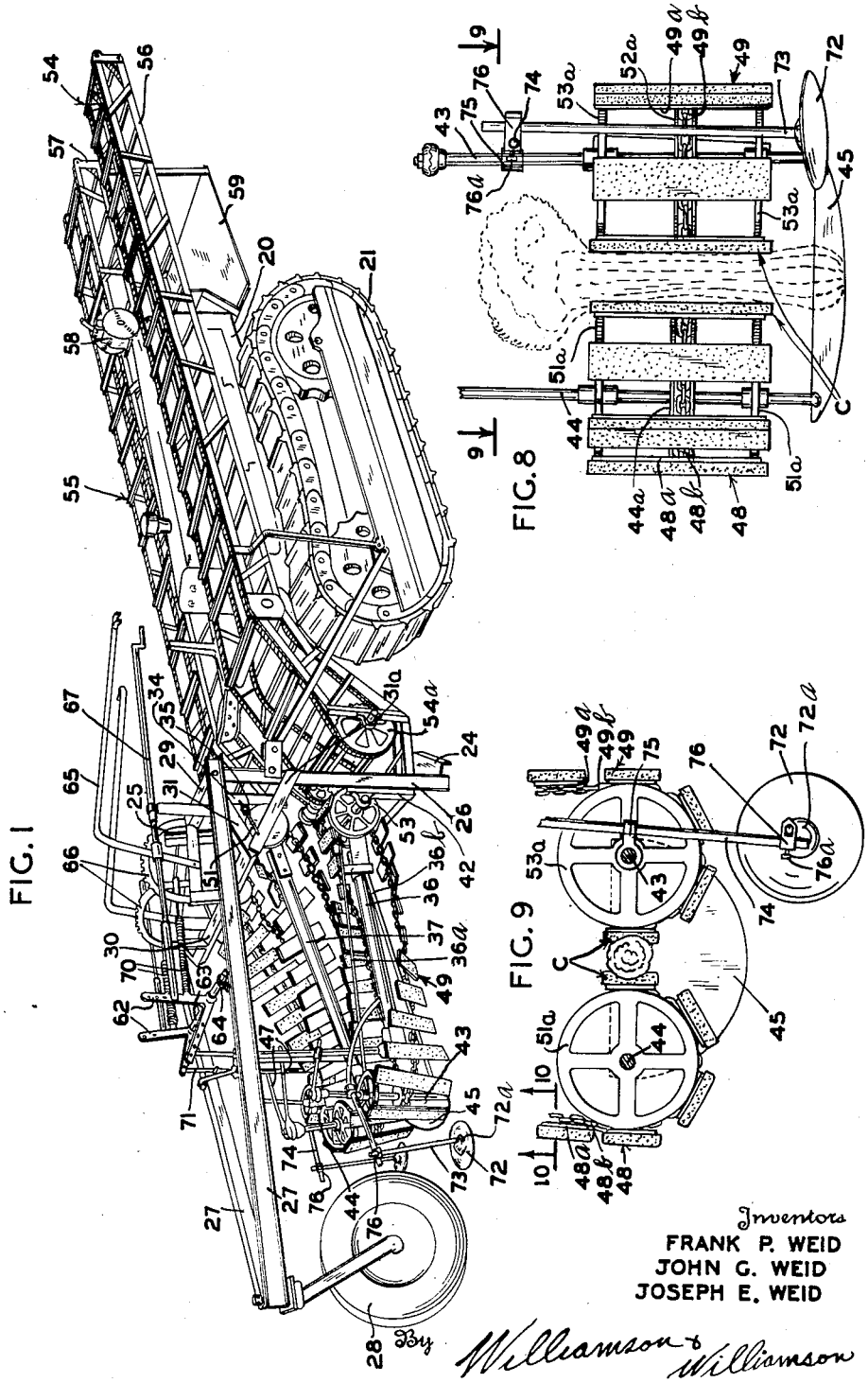
Inventors
FRANK P. WEID
JOHN G. WEID
JOSEPH E. WEID
By Williamson & Williamson
Attorneys Feb. 12, 1952     F. P. WEID ET AL     2,585,416
CELERY HARVESTER
Filed May 25, 1949     5 Sheets-Sheet 2
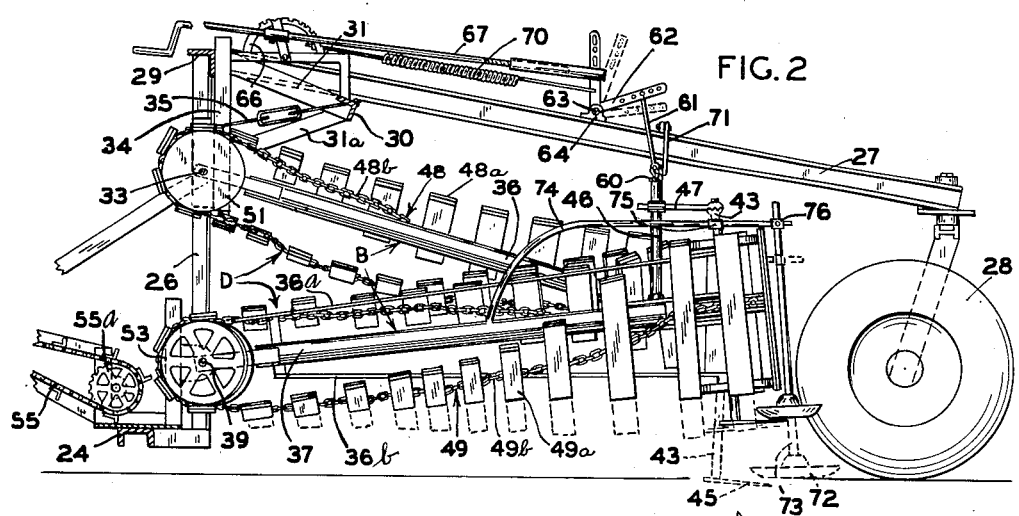
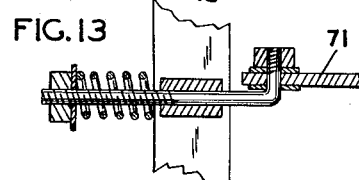
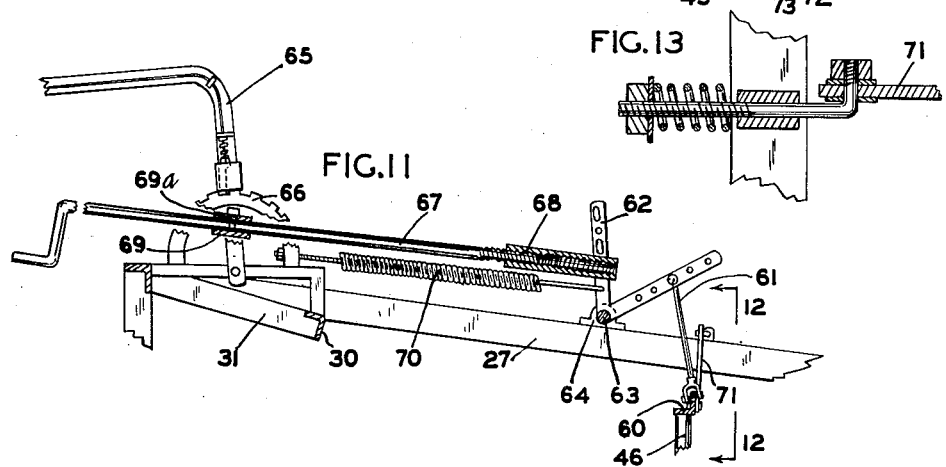
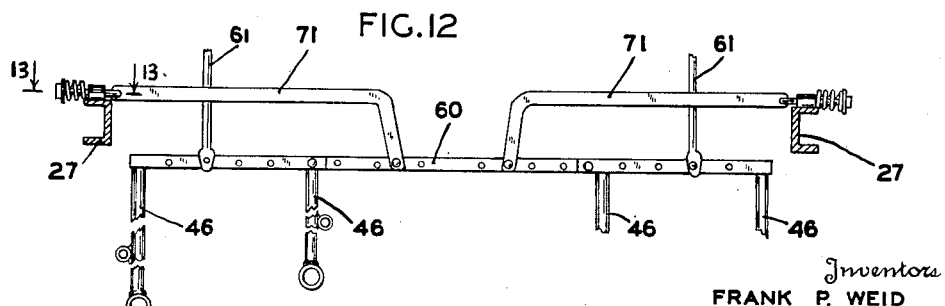
Inventors
FRANK P. WEID
JOHN G. WEID
JOSEPH E. WEID Feb. 12, 1952 F. P. WEID ET AL 2,585,416
CELERY HARVESTER Filed May 25, 1949 5 Sheets-Sheet 3

Inventors
FRANK P. WEID
JOHN G. WEID
JOSEPH E. WEID

By Williamson + Williamson
Attorneys

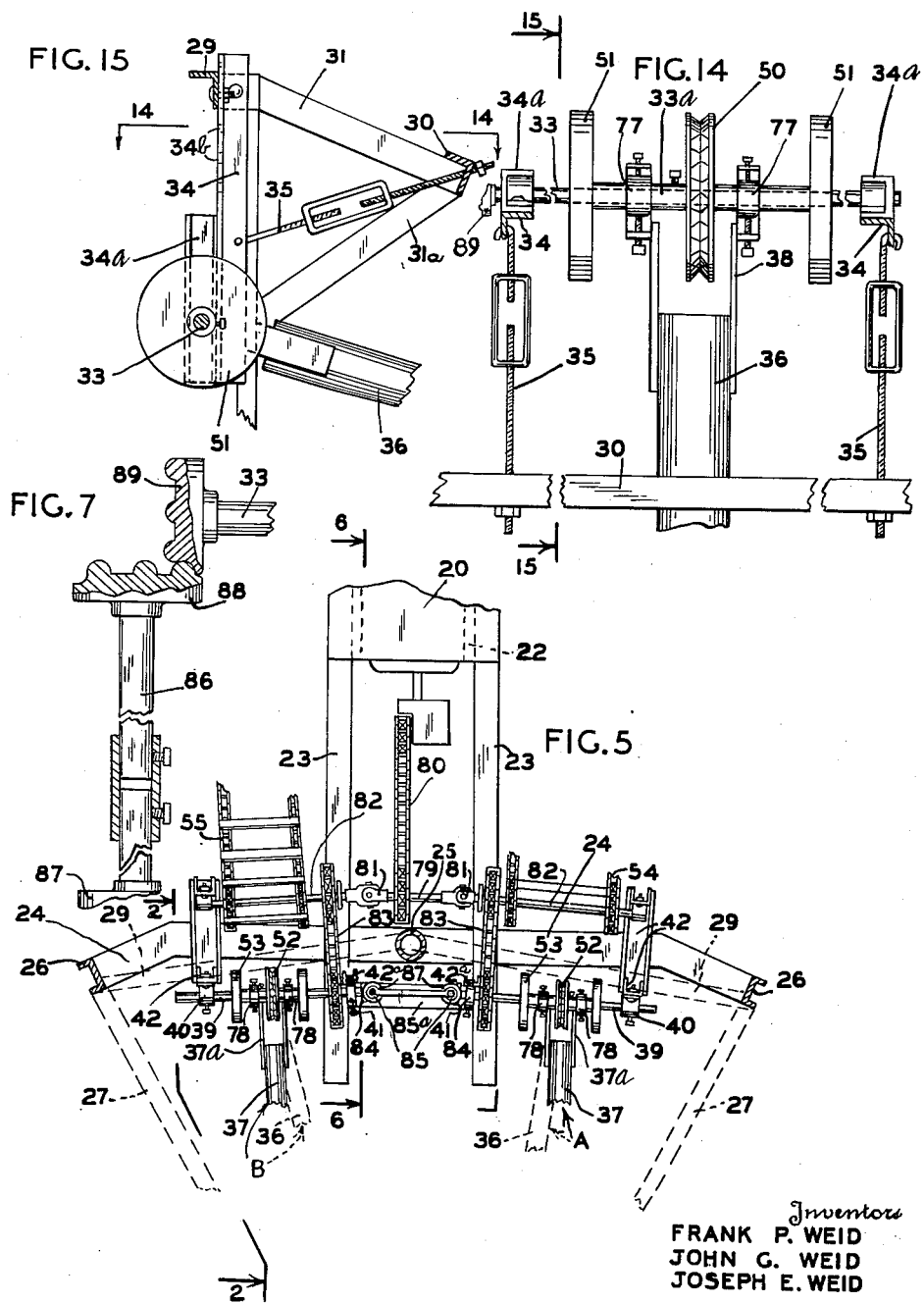

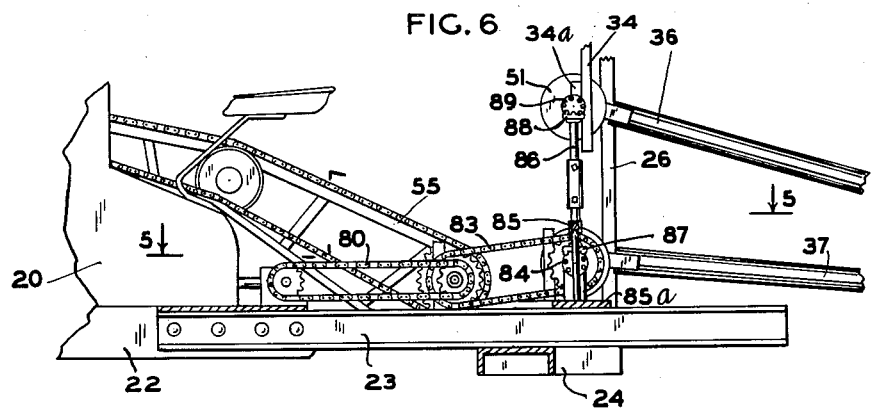
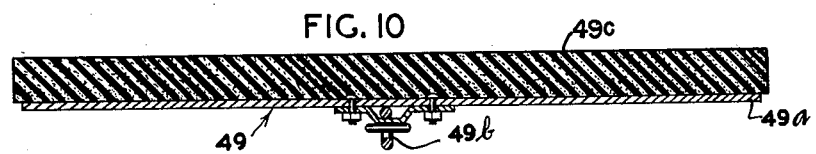
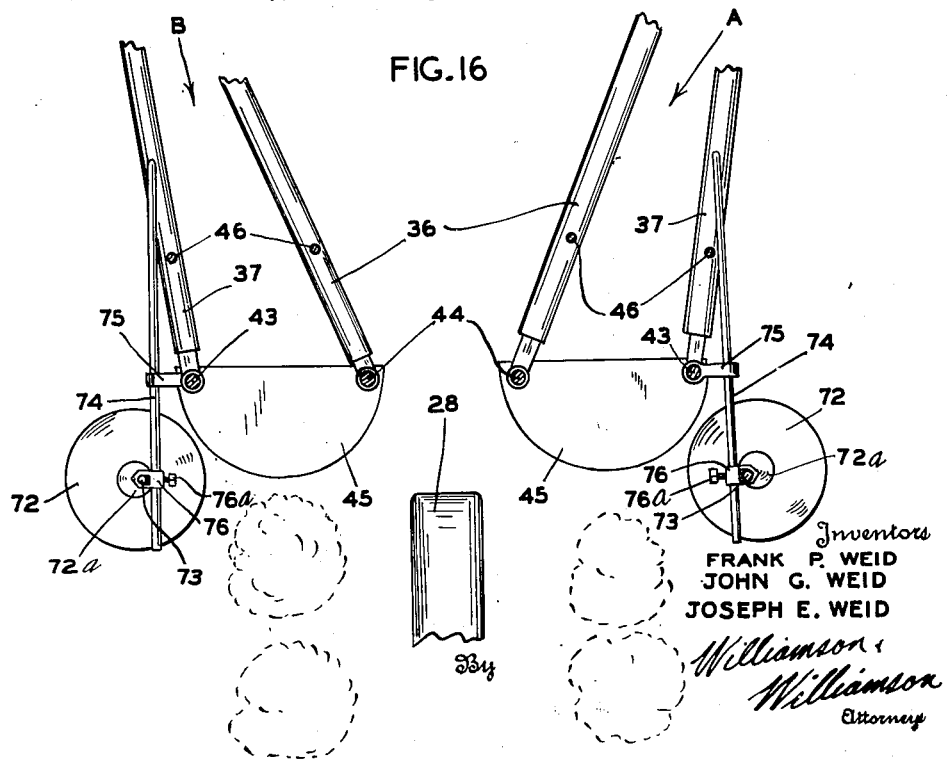

Patented Feb. 12, 1952

2,585,416

UNITED STATES PATENT OFFICE 2,585,416

CELERY HARVESTER

Frank P. Weid, John G. Weid, and
Joseph E. Weid, Red Wing, Minn.

Application May 25, 1949, Serial No. 95,314

8 Claims. (Cl. 55—107)

This invention relates to a celery harvester and particularly to a machine for cutting and collecting the celery stalks in the field.

It has long been a problem to economically harvest celery, and in the past much of this work has necessarily been done by hand labor. Now with the increased cost of labor which, of course, is directly reflected in the price of celery, it is important to improve the celery harvesting method, and therefore we have provided an extremely efficient machine for cutting and collecting celery.

It is an object of our invention to provide a novel and highly efficient mobile celery harvester which is adapted to progressively proceed down the rows of celery to successively cut the stalks growing in the rows and to convey the cut stalks rearwardly to permit collection of the same.

It is another object to provide a celery harvester adapted to cut the stalks in vertical position while simultaneously engaging the same with a pair of endless conveyor belt mechanisms moving rearwardly at the same speed as the machine is traveling forwardly along the ground and thereafter swinging said cut stalks from vertical to substantially horizontal position while carrying said stalks rearwardly on the machine to a suitable collection location.

It is still a further object to provide a celery harvester having a stationary cutting blade adapted to cut only the relatively stiff and brittle celery stalks while guiding the more flexible grass, weeds, and other vegetation outwardly to the sides of the blade without cutting the same to thus exclude the undesirable vegetation from the harvested celery crop.

It is still another object to provide a celery harvester with a stationary cutter blade mounted for extremely accurate vertical as well as lateral adjustment.

An additional object of our invention is to provide a celery harvester having a cutter mechanism with a ground-engaging blade-supporting and stabilizing shoe adapted to permit extremely accurate vertical adjustment of the cutting blade.

These and other objects and advantages of our invention will more fully appear from the following description made in connection with the accompanying drawings wherein like reference characters refer to similar parts throughout the several views and in which:

Fig. 1 is a side perspective view of our celery harvester mounted on a track-laying tractor;

Fig. 2 is a longitudinal vertical sectional view of the forward portion of our harvester taken substantially along the line 2—2 of Fig. 5 and showing one of the cutter blades and forward end portion of one of the conveyor mechanisms in raised position by full lines and in lowered operative position by dotted lines and the rear extremities of one pair of conveyors in widely spaced relation by full lines and in closely spaced relation by dotted lines;

Fig. 5 is a fragmentary horizontal sectional view taken substantially along the line 5—5 of Fig. 6 and showing the driving connections for the conveyor mechanisms, certain of the parts above the section line being shown in dotted lines and the conveyors being removed;

Fig. 6 is a vertical sectional view taken substantially on the line 6—6 of Fig. 5;

Fig. 7 is a fragmentary side elevational view showing the driving connection for the upper runs of the forward conveyors in detail with portions thereof sectioned;

Fig. 8 is a fragmentary front end elevational view of a cutter blade and one of the forward conveyor mechanisms showing a celery stalk engaged thereby;

Fig. 9 is a horizontal sectional view taken substantially along the line 9—9 of Fig. 8;

Fig. 10 is a vertical sectional view taken substantially along the line 10—10 of Fig. 9;

Fig. 11 is a fragmentary longitudinal vertical sectional view of one of the vertical adjustment mechanisms for the cutter blades and the forward conveyor mechanism;

Fig. 12 is a transverse vertical sectional view taken substantially on the line 12—12 of Fig. 11 and showing a portion of the blade carriage mechanism with the stabilizers and certain connections thereof;

Fig. 13 is a fragmentary horizontal sectional view taken substantially on the line 13—13 of Fig. 12 and showing the connection of one of said stabilizers to a supporting frame;

Fig. 14 is a horizontal sectional view taken substantially along the line 14—14 of Fig. 15;

Fig. 15 is a vertical sectional view taken substantially on the line 15—15 of Fig. 14 and showing the connection of one of the upper booms for the forward conveyor mechanism in elevation with the lateral adjustment mechanism therefor; and Fig. 16 is a horizontal sectional view taken substantially along the line 9—9 of Fig. 8 but showing both pairs of booms and both cutter blades in detail with the entire conveyor mechanism removed.

As best shown in Figs. 1 and 3 through 6 inclusive, we provide a track laying power-driven tractor 20 having the tracks 21 and the main frame 22. We have found as illustrated in the accompanying drawings, that by attaching our celery harvester with the cutter blades extending to the rear of the tractor, that the power take-off and driving mechanisms are more easily connected and that it is much easier to run the tractor in this way. Therefore, hereafter, we will refer to the rear of the tractor as the forward end thereof and the cutter elements and frame as extending forwardly of said tractor. A supporting structure for our harvester is mounted on said tractor 20 and comprises a plurality of frame members.

Figure 3:
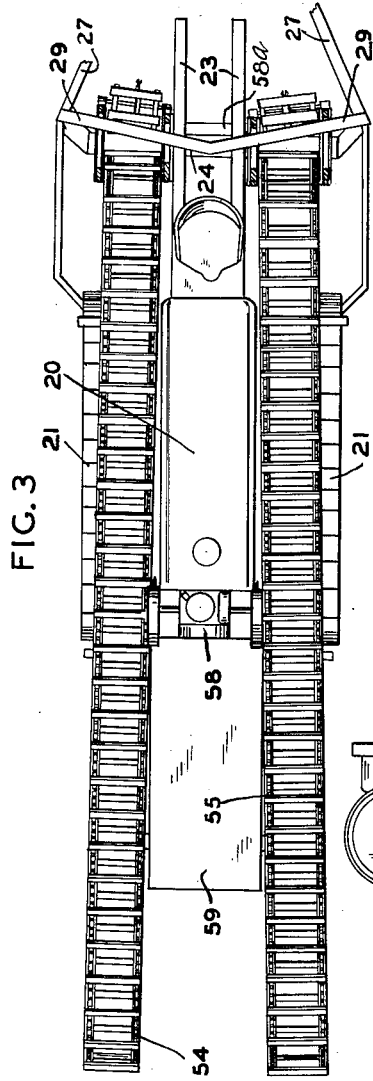
Fig. 3 is a top plan view of the rear portion of our celery harvester as mounted on a tractor.
Figure 4:
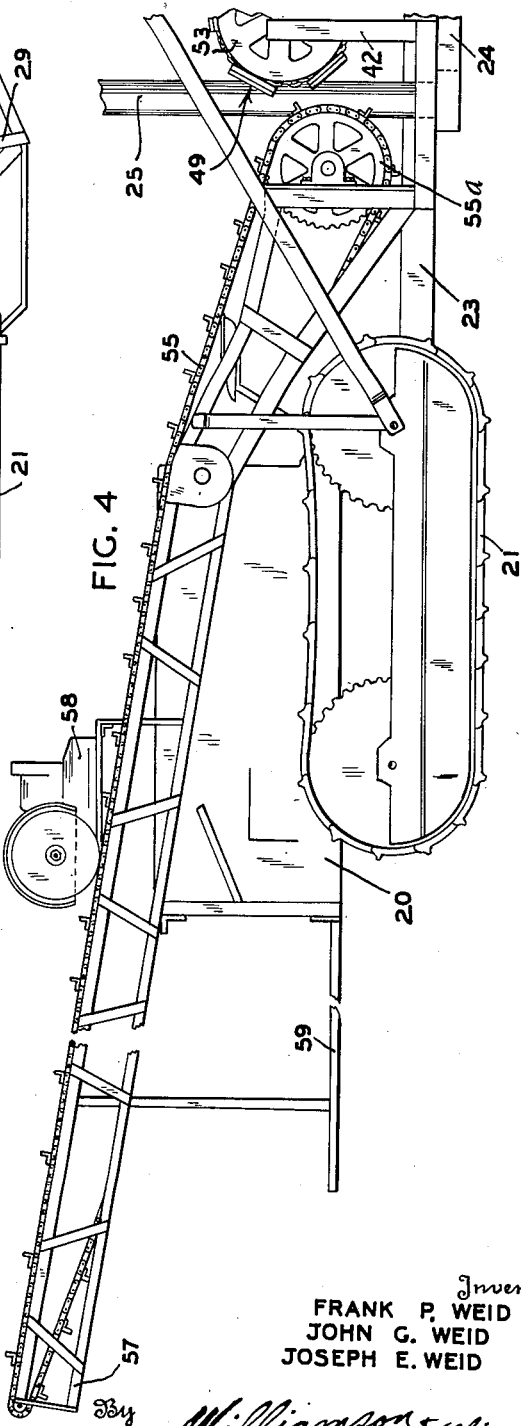
Fig. 4 is a side elevational view of the portion of our harvester shown in Fig. 3.

A pair of longitudinal beams 23 have their rear portions respectively fixed to the main tractor frame 22 as by being bolted thereto, as best shown in Fig. 6, and said beams 23 extend forwardly therefrom in parallel spaced relation to each other. A transverse stringer 24 is fixed to the forward portions of beams 23 and extends laterally outwardly therebeyond a substantial distance with the outwardly extending portions curved forwardly, as best shown in Figs. 3 and 5. A center post 25 is mounted in upright position on the center of said transverse stringer 24 and is disposed medially between the two beams 23. A pair of side uprights 26 are respectively mounted on the lateral extremities of said transverse stringer 24 and have a pair of converging supports 27 pivotally mounted at the top thereof. Said supports 27 extend forwardly in converging relationship and are joined at the forward ends thereof to form a triangulated supporting structure. A ground-engaging caster wheel 28 is mounted at the forward end of said triangulated supporting structure and carries a substantial portion of the weight at the forward end thereof.

A pair of angularly disposed braces 29 respectively interconnect center post 25 and uprights 26. A transversely disposed triangulated frame extends between the upper portions of uprights 26 to rigidly interconnect the same and has a transverse angle bar 30 with a pair of triangulated bracing structures comprising upper members 31 and lower members 31a rigidly interconnecting the respective end portions of said bar 30 with said uprights 26. Two pairs of spaced parallel depending angles 34 are adjustably fixed at their upper extremities to braces 29, as by being bolted thereto and are provided with a plurality of vertically spaced apertures 34b therethrough to permit vertical shifting thereof and adjustment of the vertical spacing between the rear extremities of the respective pairs of conveyors. Each of the depending angles 34 has a channel 34a fixed along the lower portion of the rear flange. The channels which are fixed to the respective angles 34 have their flanges disposed inwardly, as best shown in Fig. 14, in opposed relation, and a rotary shaft 33 is journaled between each pair of opposed channels, as best shown in Figs. 14 and 15. The inner ends of the two shafts 33 extend inwardly somewhat beyond the inner channels 34a to be driven, as will be hereinafter described. A turnbuckle 35 is connected to the lower portion of each of the depending angles 34 and interconnects that angle with an opposed portion of the transverse angle bar 30, as best shown in Figs. 14 and 15.

In the form of the invention illustrated, two pairs of booms A and B are provided, each pair having an upper boom 36 and a lower boom 37. The two upper booms 36 converge substantially one with the other toward their forward extremities, while the lower booms 37 converge relatively slightly, as best shown in Figs. 5 and 16. The two booms 36 and 37 in each pair A and B have their rear extremities disposed in spaced relation one above the other in the same vertical plane and their front extremities disposed in spaced relation one beside the other in the same horizontal plane. The upper booms 36 are respectively mounted on the two shafts 33 with the shafts journaled for rotation in the respective mounting brackets 38. A pair of substantially transversely disposed rotary shafts 39 are journaled in suitable bearings 40 at their outer portions and 41 at their inner portions. The outer bearings 40 are respectively mounted on uprights 42 which, in turn, are supported by the transverse stringer 26. The inner bearings 41 are respectively mounted on uprights 42a supported on the cross frame member 85a which, in turn, is connected to the longitudinal beams 23. The lower booms 37 are respectively mounted on shafts 39 with said shafts respectively journaled in suitable bearings on boom attachment brackets 37a respectively fixed at the inner ends of booms 37.

As best shown in Fig. 16, the forward ends of booms 37 are fixed respectively to a pair of upstanding cutter supports 43, and the upper booms 36 are respectively fixed to inner upstanding cutter supports 44 spaced inwardly from the upstanding cutter supports 43. An inner cutter support 44 and an outer cutter support 43 form a cooperating pair of cutter supports, and each pair has a cutting blade 45 fixed at the bottom thereof. A pair of boom supporting elements 46 are respectively fixed to each pair of booms A and B in upstanding relation thereto, and the upper ends of these boom supports 46 are adjustably carried by the pair of converging supports 27, the details of which will be described later. The upper ends of cutter supports 43 and 44 are respectively interconnected at intermediate portions of boom supports 46, as by the arms 47, as best shown in Figs. 1 and 2.

The two pairs of booms A and B have two pairs of endless stalk-engaging conveyors C and D respectively running in substantially co-extensive relation therewith. The rear portions of these conveyors are respectively horizontally journaled on the shafts 33 and 39, and the forward portions of the conveyors are respectively vertically journaled on the upstanding cutter supporting members 43 and 44. Each of the upper conveyors will be designated as an entirety by the numeral 48, and each of the lower conveyors will be designated as an entirety by the numeral 49.

Each of the upper conveyors 48 is formed by a plurality of spaced substantially parallel transversely disposed slats 48a fixed to an endless chain 48b which is trained around a driving sheave 50. A sheave 50 is mounted in fixed relation on each of the upper shafts 33 and has a plurality of link-receiving recesses formed therein to receive and drive the chain 48b. A pair of slat-engaging guiding wheels 51 are respectively fixed to each shaft 33 at the sides of the driving sheave 50 in spaced relation therefrom and serve to engage the outer portions of the slats 48a of the respective conveyors 48 as they respectively pass around the sheaves 50 at the rear end of said conveyors. The sheaves 50 are, of course, journaled on substantially horizontal axes disposed substantially transversely of the machine. The details of this driving mechanism at the rear of the upper conveyors 48 are best shown in Figs. 2 and 14. Each of the substantially vertical upstanding inner cutter supports 44 has a chain idler sheave 44a and a pair of slat guiding wheels 51a journaled for rotation thereon, and the forward ends of the two upper conveyors 48 are respectively trained about said sheaves and wheels to maintain the upper conveyors 48 in substantially vertical position at the forward ends thereof.

Each of the lower outer conveyors 49 has a plurality of slats 49a fixed to an endless chain 49b in spaced transversely disposed relation thereon. A chain driving sheave 52 is fixed to each of the rotary shafts 39, and a pair of slat guiding wheels 53 are fixed to each of the shafts 39 in spaced relation on each side of the sheaves 52, as best shown in Fig. 5. The lower conveyors 49 are respectively trained around sheaves 52 and wheels 53 at the rear extremities thereof and extend forwardly therefrom along lower booms 37 to the respective idler sheave 52a and wheel mechanisms 53a respectively journaled for rotation on the two substantially vertical outer upstanding cutter supports 43. These forward sheave and pulley mechanisms are similar to those described by the upper conveyors 48 and are respectively outwardly spaced therefrom with the forward extremities of the lower conveyors 49 trained therearound. The inner adjacent runs of each of the pairs of conveyors are in a vertical position at the forward end of the machine and the slats of the respective conveyors are substantially parallel to each other and maintain their parallelism through a substantial portion of the inner runs. At a point adjacent the rear of the machine, the upper or inner conveyor diverges upwardly from the lower or outer conveyor. All of the conveyors begin in vertically disposed upstanding position at the forward ends thereof and during their travel rearwardly pass through one quarter of a turn (90°) and are disposed substantially horizontally at their rear extremities.

The two pairs of forward conveyors C and D respectively deliver the cut stalks rearwardly to a pair of rear conveyors designated as entireties by the numerals 54 and 55 respectively. The conveyors 54 and 55 are respectively formed as from two pairs of parallel endless chains trained at their forward ends about the driving spockets 54a and 55a respectively, and these conveyors are respectively supported on the tractor 20 by the suitable frames 56 and 57 which are securely mounted on said tractor 20. A trimmer 58 is mounted toward the rear portion of said conveyors 54 and 55, and a suitable platform 59 is mounted at the rear portion of the tractor and is disposed below the conveyors 54 and 55 and extends thereunder traversing the distance therebetween to permit an operator to stand thereon.

The various adjustment mechanisms are provided as follows:

The boom and cutter elevating mechanism is mounted on the upper portion of the triangular supporting structure 27, as best shown in Figs. 1, 2, 11 and 12. The upper ends of the boom supports 46 are connected to a jointed transversely disposed member 60 which is supported by a pair of depending links 61. These links 61 respectively interconnect the end portions of said jointed transverse member with a pair of bell cranks 62 which are journaled for oscillation on a transverse shaft 63 which in turn is mounted in suitable connection elements 64 which are attached to supports 27. Said bell cranks 62 are respectively controlled by a pair of levers 65, each having a spring pressed dog adapted to be received in a slotted segment 66. A second control mechanism with a control rod 67 is provided for each of the bell cranks 62. The front end of each of the rods 67 is threadably received in an internally threaded sleeve 68 which is fixed to the respective bell cranks 62, and an intermediate portion of each rod 67 is journaled in a sleeve 69 which is fixed to the respective levers 65. Each sleeve 69 has a peripheral groove formed therein and is adapted to slidably receive an outstanding detent 69a to prevent longitudinal shifting movement of each of the rods 67 relative to the respective levers 65. A counterbalancing spring 70 is provided on each bell crank 62 to facilitate easy operation of the control mechanisms. The links 61 are purposely provided with loose connections at their ends for purposes that will be brought out in the following paragraph. A pair of lateral stabilizers 71 is provided to limit lateral shifting movement of cross bar 60 and to reduce the vertical vibration thereof.

A pair of gauge shoes 72 which in the form shown are a pair of cultivator discs are respectively journaled for concentric rotation on a pair of mounting bearings 72a which are eccentrically respectively fixed to the lower extremities of a pair of upstanding rods 73, as best shown in Figs. 1, 8, 9, and 10. The discs are disposed at an obtuse angle relative to the rods 73 so that rotation of the rods will vary the angular relation between the discs and the ground. The rods 73 are respectively anchored at their upper portions to a pair of forwardly extending supporting arms 74. The rear end portions of the two arms 74 are curved downwardly and securely fixed to the respective outer lower booms 37. A pair of attachment brackets 75, as best shown in Fig. 16, are provided to respectively interconnect the intermediate portions of arms 74 with the outer upstanding cutter supports 43. The longitudinal as well as the vertical positions of the gauge shoes 72 are respectively adjusted by means of a pair of connection clamps 76. Each of these clamps 76 has a vertically disposed slot therethrough communicating with a horizontally disposed slot. The vertically disposed slot is elongated laterally, as is the horizontally disposed slot, to permit shifting movement of the arm 74 as well as the rod 73. A V-shaped gripping jaw is provided at the outer portion of the vertically disposed slot, and a set screw 76a is provided to securely clamp arm 74 against rod 73 which is forced outwardly against the jaws of the clamp. By providing the loose linkage in the elevating mechanisms controlled by levers 65 and 67, it will be seen that the ground-engaging gauge shoes will be permitted to elevate the respective cutters 45 by engagement on the ground surface but that the bell crank control mechanisms will limit the ultimate downward position of both the shoes and the cutter blades 45.

The lateral spaced relation between the two pairs of booms A and B and the two pairs of conveyors C and D may be varied to adjust the same and the cutter blades to different row spacings. Two means are provided for adjusting the upper booms 36, one being the turnbuckles 35 interconnecting the transverse frame bar 30 with the lower free end portions of the respective depending angle bars 34, and the other being the set screw arrangement on the boom bearings. As best shown in Figs. 14 and 15, the lower ends of the angles 34 and channels 34a may be shifted longitudinally of the vehicle to adjust the position of the bearings for each of the shafts 33 by turning the individual turnbuckles 35. Additional adjustment of the booms 36 relative to the respective shafts 33 may be made by the set screw adjustment mechanism for the self-aligning bearings 77 which respectively attach the boom brackets 38 to the shaft 33 and permit said shafts to freely rotate in said bearings. The forward ends of the lower booms may also be laterally adjusted by merely adjusting the self-aligning bearings 78 provided with a set screw adjustment mechanism, and the respective shafts 39 are journaled in said bearings and connect the attachment brackets 37a to said shafts. The inner bearings 41 have a similar set screw arrangement for adjusting the position of the inner ends of the shafts 39.

The following is a description of the driving mechanism for our celery harvester. The power take-off of the tractor 20 is connected with a suitable rotary shaft 79, as by the chain and sprocket driving mechanism 80. The shaft 79 has a pair of universal joints 81 fixed on the ends thereof, and a pair of laterally extending shafts 82 are respectively fixed to the outer portions of the universal joints 81 and are journaled in suitable bearings mounted on the frame structure. A pair of chain and sprocket driving mechanisms 83 have a pair of sprocket wheels respectively fixed to the shafts 82 and a pair of sprocket wheels respectively fixed to the shafts 39 with a pair of chains respectively trained therearound. The inner ends of the shafts 39 extend inwardly beyond the respective bearings 41, and each has a ball and socket gear 84 fixed thereon. A pair of suitable bearing structures 85 is mounted on a cross frame member 85a, as best shown in Figs. 5 and 6, and each bearing structure has a pair of upstanding shafts 86 respectively journaled therein, and each shaft has a ball and socket gear 87 fixed to the bottom thereof to intermesh with the gears 84. The upper ends of the shafts 86 have a pair of ball and socket gears 88 respectively fixed thereto which are adapted to respectively intermesh with a pair of ball and socket gears 89 which are respectively fixed to the inner ends of shafts 33. As best shown in Fig. 7, the shaft 86 may be made extensible to permit adjustment thereof.

Operation

When the rows of celery are ready for harvesting, the tractor 20 is driven down said rows with the cutting blades 45 preceding the tractor. The lateral spacing between the blades 45 is initially adjusted by the turnbuckles and boom supporting shaft bearings 77 and 78, and the vertical position of said blades is also adjusted so as to penetrate a slight distance below the surface of the ground, as best shown in Fig. 2. This elevation adjustment is made by vertically positioning the adjusting shafts 73 of the gauge shoes 72 in the clamps 76 as well as adjusting the position of the bell cranks 62 by the levers 65 and 67. As best shown in Figs. 9 and 16, the cutting edges of the blades 45 are convexly curved, and the rows of celery are respectively aligned with the center portions thereof. The blades themselves are of course stationary, and the curved convex shape of the cutting edge serves to guide the relatively flexible and flimsy grass and weeds away from the stiff celery stalks which are easily cut by said blades. The speed at which the forward conveyors C and D are driven is substantially equal to the speed at which the tractor is driven. In other words, the gearing of the power take-off and the sprocket sizes are adjusted to produce the same linear speed for said forward conveyors as the linear speed of the tractor 20. Thus as the celery stalks are cut by the blades 45, they will be engaged by the slats of the conveyor which are traveling rearwardly at the same speed that the tractor is moving forwardly, and hence there will be no tugging or pulling on the celery stalks which will remain in stationary position relative to the ground as they are carried rearwardly on the forward conveyors. The stalk-engaging surface of each of the slats is suitably padded as by a relatively thick sheet of sponge rubber 49c, as best shown in Fig. 10, which extends laterally outwardly beyond the slat a substantial distance to prevent injury and damage to the celery stalks, while insuring positive gripping thereof. The cut stalks will be swung from vertical position into horizontal position by the quarter turns in the conveyors, and the tops will be swung outwardly in the form of the invention illustrated. The lower conveyors 49 will carry the stalks rearwardly and deliver the same to the forward extremities of the respective rear conveyors 54 and 55.

An operator may stand on the plateform 59 at the rear of the tractor and trim the tops of the stalks as said stalks are carried by the conveyors 54 and 55 by using a trimmer 58 with its rotary knives. After the stalks are carried to the rear of the conveyors 54 and 55, they are boxed, and if the tops have not already been trimmed, they are then trimmed by hand using a long knife. The ball and socket gears permit the angular relation between the shafts to be varied as when the lateral position of the conveyors is adjusted without hindering the driving connection between the shafts.

An extremely important feature of our invention is the combinative relation between the cutting blades and the respective pairs of conveyors which initially cut and engage the celery stalks in vertical position and then carry the same rearwardly on the machine while simultaneously shifting said stalks from vertical to horizontal position, in which position they are adapted for subsequent disposal. The ninety degree twist in the conveyors is an extremely simple and highly efficient way of shifting the cut celery stalks from vertical to horizontal position. Suitable generally longitudinally disposed rods 36a and 36b are mounted on each of the lower booms 36 to provide slat-engaging guides on which the slats of both the upper and lower runs of the lower outer conveyor may smoothly ride to prevent said runs from interfering one with the other and to provide support for the upper celery-carrying run to maintain the inner opposed runs of each pair of conveyors in closely spaced relation throughout their lengths to securely grip the celery stalks therebetween and carry the same rearwardly thereon. The relatively thick sponge rubber pads of the conveyor slats permit celery stalks of varying sizes to be securely gripped between the opposed runs of the conveyors without injuring the celery stalks. In the form of our invention shown the chain-receiving grooves in the sheaves of the forward conveyors C and D are of sufficient depth to prevent the respective chains trained therearound from running off said sheaves. Suitable chain guides might also be provided to prevent said chains from riding off the sheaves under extremely heavy load conditions. The control levers 65 permit the respective pairs of conveyors and the respective blades 45 which are connected therewith to be raised above the ground surface to facilitate transportation of the machine from one location to another.

It will be seen that we have provided a relatively simple yet highly efficient celery harvester adapted to cut and collect the celery stalks to permit extremely easy harvesting of the celery crop. The celery may be crated in the field on wagons towed behind the machine or may be merely collected in the wagons for subsequent crating. The gauge shoes stabilize the cutter blades and permit extremely accurate adjustment of the cutting depth thereof. Our harvesting machine cuts and handles the celery stalks in a gentle manner, and experience has shown that there is considerably less injury and breakage of the celery stalks through use of our machine than was previously experienced by hand cutting methods.

It will, of course, be understood that various changes may be made in the form, details, arrangement and proportions of the parts without departing from the scope of our invention.

What we claim is:

1. A celery harvester comprising a supporting structure adapted to be connected to a mobile vehicle with a portion extending forwardly of the vehicle, a drive means on the vehicle, a stationary laterally convex cutting blade for each row being cut, having a forwardly extending curved cutting edge, mounted on the forwardly extending portion of the structure, the blade when in use being disposed slightly below the surface of the ground to engage and cut the stalk of celery below the ground level, a conveyor mechanism mounted on the forwardly extending portion comprising a pair of coacting endless conveyors for each cutting blade and connected to the drive means, vertical shafts mounted on the forward end of the forwardly extending portion, the conveyors of each pair having their inner runs disposed in substantially closely spaced relationship to each other throughout their entire length, the forward ends of each of the conveyors being disposed in upstanding relation about the vertical shafts and closely adjacent the cutting edge of the blade, the conveyors extending rearwardly from the cutting blade, a horizontal arm connected to one of the vertical shafts and extending forwardly thereof, a gauge shoe connected to the horizontal arm and means to adjust the connection between the gauge shoe and the horizontal arm to vary and control the depth to which cutting blade is disposed, whereby as the cutting edge of each blade engages and cuts the stalk, the stalk is simultaneously gripped by the conveyors and carried rearwardly by the conveyors to subsequent collection.

2. The structure as defined in claim 1 wherein the endless conveyors comprise an endless chain having a series of slats mounted thereon, the slats having a resilient pad on the face opposed to the chain to securely grip the stalk when cut.

3. The structure as defined in claim 1 wherein the endless conveyors are mounted on horizontally disposed shafts at the rear end of the supporting structure which together with the vertical mounting at the forward end of the supporting structure will cause the stalk to be gripped in the same condition that it is growing and be turned 90° from vertical before delivery to the collector.

4. The structure as defined in claim 1 wherein the connection between the conveyors and the drive means comprises a reduction unit so that the conveyors are driven at substantially the same speed as the forward speed of the vehicle so that the stalks are not pulled from the ground but will remain in substantially stationary position relative to the ground.

5. A celery harvester comprising a supporting structure adapted to be connected to a mobile vehicle with a portion extending forwardly of the vehicle, the forwardly extending portion comprising forwardly extending frame members, a drive means on the vehicle, a pair of booms extending forwardly from the rear of the supporting structure and substantially within the confines of the forwardly extending frame, the rear ends of the booms being mounted on the rear of the supporting structure in substantial vertical alignment, the forward ends of the booms being free and in substantial horizontal alignment and supporting a stationary cutting blade having a forwardly extending cutting edge, the blade when in use being disposed slightly below the surface of the ground to engage and cut the stalk of celery below the ground level, a conveyor mechanism mounted on the supporting structure and connected to the drive means, the conveyor mechanism comprising a pair of coacting endless conveyors surrounding each of the booms, the forward ends of the booms supporting the forward end of the endless conveyors, the endless conveyors having opposed stalk engaging means thereon and being horizontally disposed at the rear of the supporting structure and vertically disposed at the forward end, the adjacent inner runs of the conveyors traveling in a closely spaced substantially parallel relationship from the forward end of the booms to a point adjacent the rear of the booms where they diverge sharply, whereby as the stalk of celery is cut by the cutting blade it is substantially simultaneously gripped by the adjacent inner runs of the conveyors and turned from the vertical to the horizontal during the travel of the conveyors which constitute the sole means of support for the cut stalk during the travel to the rear of the supporting structure where the cut stalk is collected.

6. The celery harvester as defined in and by claim 5 wherein the opposed stalk engaging means are a series of equi-spaced parallel slats mounted upon the endless conveyors.

7. The celery harvester as defined in and by claim 6 wherein the stationary cutting blade is convexed laterally and the forwardly extending cutting edge is curved.

8. The celery harvester as defined in and by claim 5 wherein the connection between the conveyors and the drive means comprises a reduction unit so that the conveyors are driven at substantially the same speed as the forward speed of the vehicle whereby the stalks are not pulled from the ground but will remain in substantially stationary position relative to the ground.

FRANK P. WEID.
JOHN G. WEID.
JOSEPH E. WEID.

REFERENCES CITED

The following references are of record in the file of this patent:

UNITED STATES PATENTS

| Number | Name | Date |
| --- | --- | --- |
| 1,031,274 | Kinder | July 2, 1912 |
| 1,166,083 | Russell | Dec. 28, 1915 |
| 1,190,598 | Seierup | July 11, 1916 |
| 1,568,594 | Flint | Jan. 5, 1926 |
| 1,928,868 | Poen | Oct. 3, 1933 |
| 1,999,638 | Richards | Apr. 30, 1935 |
| 2,297,294 | Flintjer | Sept. 29, 1942 |
| 2,300,063 | Romine | Oct. 27, 1942 |
| 2,436,831 | Silva | Mar. 2, 1948 |